(12) United States Patent
Angelopoulos

(10) Patent No.: US 8,435,627 B2
(45) Date of Patent: May 7, 2013

(54) MULTIFUNCTIONAL NANOCOATINGS WITH MIXED NANOPARTICLES AND PROCESS FOR FABRICATING SAME

(75) Inventor: Anastasios Angelopoulos, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 1463 days.

(21) Appl. No.: 12/025,920

(22) Filed: Feb. 5, 2008

(65) Prior Publication Data

US 2012/0135211 A1 May 31, 2012

(51) Int. Cl.
*B32B 7/02* (2006.01)

(52) U.S. Cl.
USPC ........... 428/213; 428/336; 977/742; 977/773; 977/775; 427/58

(58) Field of Classification Search .................... 429/530
See application file for complete search history.

(56) References Cited

U.S. PATENT DOCUMENTS

| | | | |
|---|---|---|---|
| 6,881,448 | B1 | 4/2005 | Hattori |
| 2006/0062982 | A1* | 3/2006 | Hammond Cunningham et al. ............................. 428/220 |
| 2007/0106006 | A1 | 5/2007 | Cooper et al. |
| 2007/0141238 | A1 | 6/2007 | Angelopoulos et al. |
| 2007/0202247 | A1* | 8/2007 | Peters et al. .................. 427/115 |

* cited by examiner

*Primary Examiner* — Ula C. Ruddock
*Assistant Examiner* — Scott J Chmielecki
(74) *Attorney, Agent, or Firm* — Dinsmore & Shohl LLP

(57) ABSTRACT

Embodiments of a coated substrate comprise a substrate (100) with a multi-functional multi-layer nanoparticle coating (105) having a thickness of up to about 500 nm thereon. The nanoparticle coating (105) comprises an ionic polyelectrolyte layer (110), and a mixed colloid layer disposed over the polyelectrolyte layer (110). The mixed colloid layer comprises hydrophilic colloid ions (130) and conductive colloid ions (120) which is coupled through electrostatic or non-electrostatic forces, and the conductive colloid ions (120), the hydrophilic colloid ions (130), or both are coupled to the polyelectrolyte layer (110).

24 Claims, 1 Drawing Sheet

MULTIFUNCTIONAL NANOCOATINGS WITH MIXED NANOPARTICLES AND PROCESS FOR FABRICATING SAME

CROSS-REFERENCE TO RELATED APPLICATIONS

The present application is related to co-depending U.S. application Ser. No. 12/025,923 filed Feb. 5, 2008.

FIELD OF THE INVENTION

Embodiments of the present invention are generally related to multi-layer nanoparticle coatings, and are specifically related to multi-layer multi-functional nanoparticle coatings with mixed nanoparticles configured to be conductive and hydrophilic.

BACKGROUND OF THE INVENTION

Multi-layer nanoparticle assemblies have been recognized as being beneficial in various industrial applications, for example, fuel cell applications, electronics, cell biology, biomedicine, and pharmaceuticals. Referring to FIG. 1 (Prior Art), a conventional assembly comprises a substrate 10 (for example, a conductive gold substrate), a cationic layer 20 (for example, polyacrylamide) over the substrate 10, and an anionic layer 30 comprised of nanoparticles (for example, silica nanoparticles) that bind to the cationic layer 20. The substrate 10 may comprise multiple cationic 20/anionic 30 bilayers over the substrate 10.

By adding the silica nanoparticles, the coated substrate is made hydrophilic, which may be beneficial for various industrial applications such as fuel cells; however, the coating may cause the substrate to lose its conductivity. In the above example, the hydrophilicity of the coated substrate is demonstrated by an advancing contact angle of 16° and a receding contact angle of 9° whereas an uncoated substrate demonstrates (more hydrophobic) advancing and receding contact angles of 84° and 18°, respectively. However, an electrical contact resistance of 174 m$\Omega$-cm$^2$ was measured at a contact pressure of 200 psi for the coated substrate compared to a contact resistance of 23 m$\Omega$-cm$^2$ for the bare substrate at the same contact pressure, thereby demonstrating that the silica nanoparticles are electrically insulating, not electrically conductive. The present inventors have recognized the importance of achieving both conductivity and hydrophilicity, especially in industrial applications such as PEM fuel cells. Consequently, the multi-layer nanoparticle coating of the present invention is optimized to achieve both of these properties. More specifically, the nanoparticle coating may be applied from a single nanoparticle suspension, eliminating the need for immersion of the piece to be coated into multiple suspensions.

SUMMARY OF THE INVENTION

According to one embodiment, a coated substrate comprising a substrate and a multi-layer nanoparticle coating having a thickness of up to about 500 nm thereon is provided. The nanoparticle coating comprises an ionic polyelectrolyte layer, and an ionic mixed colloid layer disposed over the polyelectrolyte layer. The ionic mixed colloid layer the mixed colloid layer comprises hydrophilic colloid ions and conductive colloid ions coupled to one another through electrostatic or non-electrostatic forces. The conductive colloid ions, the hydrophilic colloid ions, or both are coupled to the polyelectrolyte layer.

According to another embodiment, the nanoparticle coating comprises a cationic polyelectrolyte layer comprising a polyacrylamide (e.g. a copolymer of acrylamide and a quarternary ammonium salt), and an ionic mixed colloid layer disposed over the polyelectrolyte layer. The mixed colloid layer comprises anionic hydrophilic colloid ions comprising silica nanoparticles and anionic conductive colloid ions comprising carbon based nanoparticles, wherein the silica nanoparticles and the carbon based nanoparticles are coupled through non-electrostatic forces, and the silica nanoparticles, the carbon based nanoparticles, or both are coupled to the cationic polyelectrolyte layer through electrostatic forces. The result of such coupling interactions is a densely packed mixed colloid layer.

According to yet another embodiment, a method of providing a nanocoating on a substrate is provided. The method comprises the steps of providing a substrate surface, and forming the nanocoating by immersing the substrate into a solution comprising cationic polyelectrolyte, anionic hydrophilic colloids and anionic conductive colloids. The anionic hydrophilic colloids couple with anionic conductive colloids by non-electrostatic forces, and the cationic polyelectrolytes couple to the anionic hydrophilic colloids, the anionic conductive colloids or both by electrostatic forces.

These and additional features provided by the embodiments of the present invention will be more fully understood in view of the following detailed description, in conjunction with the drawings.

BRIEF DESCRIPTION OF THE DRAWINGS

The following detailed description of specific embodiments of the present invention can be best understood when read in conjunction with the drawings enclosed herewith. The drawing sheets include.

Figure 1:
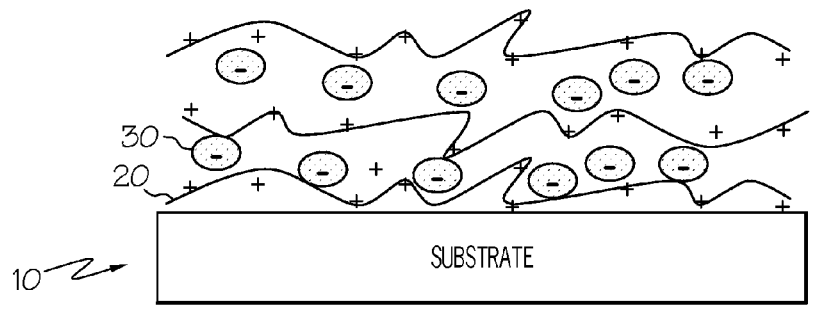
FIG. 1 (Prior Art) is a schematic illustration of a conventional substrate coating.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION

Figure 2:
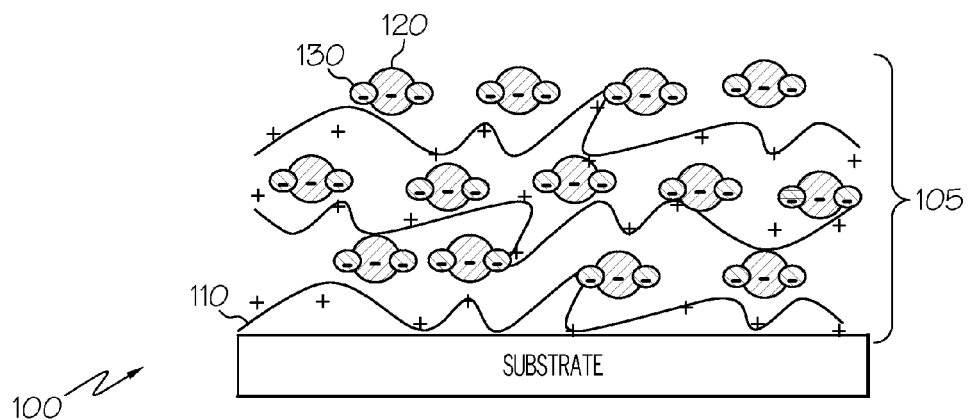
FIG. 2 is a schematic illustration of a multi-layer nanoparticle coating provided on a substrate according to one or more embodiments of the present invention.

Referring to FIG. 2, a substrate 100 (e.g a metal substrate, an organic substrate, or combinations thereof) coated with a multi-layer nanoparticle coating 105 is shown. The substrate 100 may comprise various compositions, for example, metal based compositions including gold and various grades of stainless steel or polymeric formulations. As used herein, a "layer" may comprise a continuous distribution of particles, a dispersion of mixed particles coupled together, or combinations thereof. The coating 105 comprises an ionic polyelectrolyte layer 110, and an ionic mixed colloid layer (although not numbered, the mixed colloid layer is a layer distribution of ions 120 and 130) disposed over the polyelectrolyte layer 110. In one exemplary embodiment, the ionic polyelectrolyte layer 110 is cationic and the ionic mixed colloid layer is anionic; however, it is contemplated that the ionic charge may be reversed such that the ionic polyelectrolyte layer 110 is anionic and the ionic mixed colloid layer is cationic.

Further referring to FIG. 2, the mixed colloid layer comprises a suspension or arrangement of hydrophilic colloid ions 130 and conductive colloid ions 120 coupled to one another through electrostatic forces (e.g. the attraction of formal positive and negative charges) or non-electrostatic forces (e.g. dipole-dipole interaction, ion-dipole interaction, van de Waals forces). If the hydrophilic colloid ions 120 comprise charges opposite the conductive colloid ions 120, then the conductive colloid ions 120 and the hydrophilic conductive ions 130 are likely to couple via electrostatic attraction. However, if the colloid ions 120 and 130 have the same charge i.e. both are anions, then the ions will couple via non-electrostatic forces. When coupling, the colloid ions 120, 130 may agglomerate in random configurations to form densely packed mixed colloid layers. As shown in the exemplary embodiment of FIG. 2, an anionic conductive colloid ion 120 may couple to two anionic hydrophilic colloid ions 130. Other configurations are contemplated herein.

Further as shown in FIG. 2, the conductive colloid ions 120, the hydrophilic colloid ions 130, or both are coupled to the polyelectrolyte layer 110. Similarly, the conductive colloid ions 120, the hydrophilic colloid ions 130, or both may be coupled to the polyelectrolyte layer 110 through electrostatic attraction, dipole-dipole interaction, ion-dipole interaction, van de Waals forces, or combinations thereof. As shown in the example of FIG. 2, the polyelectrolyte layer 110 is cationic and the colloids 120 and 130 are anionic, thus the coupling occurs via electrostatic attraction between positive and negative charged ions. Utilizing a single suspension of hydrophilic colloid anions 130 and conductive colloid anions 120 ensures that the particles couple to one another. Although the present invention is primarily directed to colloid nanoparticles, it is contemplated that non-colloid mixtures, for example, single phase mixtures, may also be used herein.

The cationic polyelectrolyte layer 110 may comprise various compositions suitable to produce a cationic or anionic charge, for example, copolymers of acrylamide and quarternary ammonium salts. Such materials are commercially available in powder form as C-442 polymer from CYTEC. Any charge density or molecular weight available from the Superfloc C CYTEC line is suitable for this invention (e.g., C-444 through C-496). Other suitable cationic polymers for attracting anionic colloids include polyallyl amines or polyamido amines; available commercially as either powders or as liquids. The polymers are typically dispersed in aqueous media under conditions such that they do not become amphiphilic. For example, solution pH must be maintained below about 7 in the case of the CYTEC copolymers to prevent dissociation of hydrolyzed acrylamide groups. Solution pH may be controlled using various acids ($H_2SO_4$, HCl) or bases (NaOH, $NH_4OH$). Alcohols (e.g., isopropanol, ethanol, methanol), surfactants (e.g., Triton X-100, the FC series from Dupont), and electrolytes (e.g., NaCl, KCl, $Na_2SO_4$) may be further added to vary the charge density on both the polymer and the adsorbing colloid. Charge density may be tailored to achieve the desired final coating composition. Alcohol content will range from 0 to 99% by volume and electrolyte content will range from about 0 to about 2 mols.

In the mixed colloid layer, the hydrophilic colloid ions 130 comprise silica nanoparticles and the conductive colloid ions 120 comprise carbon based nanoparticles. For example, the hydrophilic colloid may comprise X-Tec 3408 or 4014 silica nanocomposites from Nano-X or colloidal silica nanoparticles in polishing suspensions from electron microscopy suppliers such as EMS (Electron Microscopy Supply) Other sources of silica nanoparticles include the Ludox series from DuPont. The carbon based nanoparticles may comprise numerous suitable compositions, for example, graphite flakes, carbon platelets, carbon nanotubes, laser-deposited amorphous carbon spheres, carbon black, or combinations thereof. In one embodiment, the conductive colloid ions may comprise Aquadag E carbon platelets from Acheson. In one embodiment, the conductive colloid ions 120 may comprise spherical amorphous carbon from Sigma-Aldrich. In one embodiment, the ratio of carbon in the conductive colloid ions 120 to silica in the hydrophilic colloid ions 130 is equal to about 7:1 to about 1:1. The carbon to silica weight ratio may be varied to achieve the desired hydrophilicity and electrical conductivity. In one embodiment, a weight ratio of between 7:1 to 2:1 is sufficient to maximize both hydrophilicity and electrical conductivity for fuel cell applications. Coating thicknesses may be controlled to within the diameter of a single colloid particle and may be varied from a few nanometers to hundreds of nanometers depending on the desired durability of the coating. In one embodiment, the coating thickness is about 80 nm to about 400 nm.

The conductive colloid ions 120 comprise nanoparticles having a thickness of about 5 to about 100 nm, and a width of about 5 to about 800 nm. The hydrophilic colloid ions 130 comprise a width of about 5 to about 100 nm. The cationic polymer layer has a monolayer thickness of up to about 1 nm. The hydrophilic and conductive anionic nanoparticles are each deposited in a single suspension having a pH above the iso-electric point of both nanoparticles such that the nanoparticles possess a negative charge and form nanoparticle dispersions, which remain stable during deposition onto a substrate. The components and the amount of the components (solids, alcohol, surfactant, and electrolyte content) may be varied to achieve the desired final coating composition. Cationic polyelectrolyte application may be alternated with mixed colloid layer deposition to produce desired coating thickness. Extensions of the above coatings 105 will become obvious to those skilled in the art. Upon formation, the nanoparticle coating 105 has a contact resistance of between about $10^{-5}$ to about 100 m$\Omega$-cm$^2$, an advancing contact angle between about 20 to about 45° and a receding contact angle between about 0 to about 20°.

Examples of methods of coating the substrate are provided below. In operation, the coated substrate is produced by immersing an electroplated gold substrate in a solution comprising a mixed hydrophilic/conductive colloid suspension bound to a polyelectrolyte binder. In an experimental example, the cationic polyelectrolyte may utilize a solution comprising 0.6 g/l Superfloc C442 in water at a pH value of 4.6 adjusted with $H_2SO_4$. The mixed colloid suspension contains 5% by volume colloidal silica suspension (EMS) and 5% by weight Aquadag E in 50/50 volume mixture of isopropanol and water. The pH is adjusted to a value of 5.0 using $H_2SO_4$. A total of two mixed colloid layers (interspersed by two cationic polyelectrolyte layers) were deposited to produce a coating thickness of about 120 nm and a C/Si elemental weight ratio of 5.5 as measured using Energy Dispersive Spectroscopy.

Referring to the example of FIG. 1, the coating produced an unacceptable 174 mV potential drop at 1 A/cm$^2$ during fuel cell experimentation (a contact resistance of 174 m$\Omega$-cm$^2$). In contrast, the experimental example above yielded a potential drop of only 29.1 mV at 1 A/cm$^2$ under fuel cell experimentation (a contact resistance of 29.1 m$\Omega$-cm$^2$). The low contact resistance is present despite the much lower carbon loading relative to a pure carbon platelet multilayer. The present inventors have recognized that contact resistance is found to be relatively insensitive to increased carbon and silica loadings associated with the deposition of additional layers in the coating 105. Moreover, dynamic wetting analysis yielded an advancing contact angle in water of 31° and a receding contact angle of 1°, a substantial reduction relative to the uncoated gold substrate.

Moreover, there are further advantages resulting from the mixed colloid suspension. For instance, improved durability of the nanocoating was discovered. For example, after 6 days immersion in water at 80° C., the silica content of pure silica multilayers as illustrated in FIG. 1 was completely dissolved; however, there was no change in the silica content of coatings prepared utilizing the associated mixed colloid approach disclosed herein. This is quite beneficial for fuel cell applications, which are defined by aqueous environments.

As a further example, the colloid suspension in the previous example was prepared using ethanol as a substitute for isopropanol and applied to an identical substrate material. The resultant coating had a C/Si weight ratio of 6.8, a thickness of about 120 nm, a contact resistance of 29.1 mΩ-cm$^2$, an advancing contact angle of 34° and a receding contact angle of 3°.

In yet another example, a colloid suspension was prepared using a 10% by volume suspension of X-tec 3408 instead of EMS silica and ethanol instead of isopropanol. Four cationic polyelectrolyte/mixed colloid layers were applied to an identical substrate material. The resultant coating had a C/Si weight ratio of 4.6, a thickness of about 100 nm, a contact resistance of 91.6 mΩ-cm$^2$, an advancing contact angle of 33° and a receding contact angle of 7°.

In another example, a similar colloid suspension was applied three times to an identical substrate (with interspersed cationic polyelectrolyte layers). The resultant coating had a C/Si weight ratio of 5.9, a thickness of about 200 nm, a contact resistance of 68.1 mΩ-cm$^2$, an advancing contact angle of 34° and a receding contact angle of 6°.

In a further example, the colloid suspension was prepared with a pH adjusted to a value of 7 instead of 5 using H$_2$SO$_4$. Two cationic polyelectrolyte/mixed colloid layers were applied to an identical substrate material. The resultant coating had a C/Si weight ratio of 2.4, a thickness of about 120 nm, a contact resistance of 35.6 mΩ-cm$^2$, an advancing contact angle of 24° and a receding contact angle of 9°.

As a further example, a mixed colloid suspension is prepared containing 0.25% by volume colloidal silica suspension (EMS) and 0.1% by weight amorphous carbon (Sigma-Aldrich) in 50/50 volume mixture of isopropanol and water. The pH is adjusted to a value of 5.0 using H$_2$SO$_4$. The cationic polyelectrolyte solution contains 0.72 g/l CYTEC C-442 and 25% by volume ethanol in water with the pH adjusted to a value of 5.1 using H$_2$SO$_4$. A total of four mixed colloid layers (interspersed by four cationic polyelectrolyte layers) were deposited onto a stainless steel substrate to produce a coating thickness of about 200 nm and a C/Si elemental weight ratio of 2.5 as measured using Energy Dispersive Spectroscopy. The contact resistance of the coating was 31.2 mΩ-cm$^2$ compared to a value of about 23 mΩ-cm$^2$ for the uncoated substrate and a value exceeding 1000 mΩ-cm$^2$ for an identical substrate coated with a comparable thickness of EMS silica alone. The mixed colloid-coated substrate had an advancing contact angle of 24° and a receding contact angle of 6°. This compares to an advancing contact angle of 60° and a receding contact angle of 20° for the bare substrate. In all of the above examples, the immersion cycles may be repeated to achieve the desired coating thicknesses described above.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A coated substrate comprising a substrate (100) and a multi-layer nanoparticle coating (105) having a thickness of up to about 500 nm thereon, wherein the nanoparticle coating (105) comprises:
   an ionic polyelectrolyte layer (110); and
   an ionic mixed colloid layer disposed over the polyelectrolyte layer (110), wherein the mixed colloid layer comprises hydrophilic colloid ions (130) and conductive colloid ions (120) coupled to one another through electrostatic or non-electrostatic forces, and the conductive colloid ions (120) and the hydrophilic colloid ions (130) are both coupled to the polyelectrolyte layer (110), wherein the coating has an elemental weight ratio of conductive colloid ion to hydrophilic colloid ion of about 1:1 to about 7:1 as measured by Energy Dispersive Spectroscopy (EDS).

2. The coated substrate of claim 1 wherein the polyelectrolyte layer (110) is cationic and the hydrophilic colloid ions (130) and conductive colloid ions (120) are anions, cations, or combinations thereof.

3. The coated substrate of claim 1 wherein the conductive colloid ions (120), the hydrophilic colloid ions (130), or both are coupled to the polyelectrolyte layer (110) through electrostatic attraction, dipole-dipole interaction, ion-dipole interaction, van de Waals forces, or combinations thereof.

4. The coated substrate of claim 1 wherein the conductive colloid ions (120) are coupled to the hydrophilic colloid ions (130) through dipole-dipole interaction, ion-dipole interaction, van de Waals forces, or combinations thereof.

5. The coated substrate of claim 1 wherein the substrate (100) comprises metal based material, organic material, or combinations thereof.

6. The coated substrate of claim 1 wherein the substrate (100) comprises gold, iron, stainless steel, or combinations thereof.

7. The coated substrate of claim 1 wherein the substrate (100) is at least one surface of a PEM fuel cell component.

8. The coated substrate of claim 1 wherein the polyelectrolyte layer (110) comprises polyacrylamide, polyallyl amines, polyamido amines, or combinations thereof.

9. The coated substrate of claim 1 wherein the polyelectrolyte layer (110) comprises a copolymer of acrylamide and a quarternary ammonium salt.

10. The coated substrate of claim 1 wherein the conductive colloid ions (120) comprise carbon based nanoparticles.

11. The coated substrate of claim 10 wherein the carbon based nanoparticles are graphite flakes, carbon platelets, carbon nanotubes, laser-deposited amorphous carbon spheres, carbon black, or combinations thereof.

12. The coated substrate of claim 1 wherein the conductive colloid ions (120) comprise nanoparticles comprising a thickness of about 5 to about 100 nm.

13. The coated substrate of claim 1 wherein the conductive colloid ions (120) comprise nanoparticles comprising a width of about 5 to about 800 nm.

14. The coated substrate of claim 1 wherein the hydrophilic colloid ions (120) comprise silica nanoparticles.

15. The coated substrate of claim 1 wherein the hydrophilic colloid ions (130) comprise a thickness of about 5 to about 100 nm.

16. The coated substrate of claim 1 wherein the polyelectrolyte layer (110) comprises a width of up to about 1 nm.

17. The coated substrate of claim 1 wherein the hydrophilic colloid ions (130) and conductive colloid ions (120) are applied from a mixed suspension at a pH above the isoelectric point.

18. The coated substrate of claim 1 wherein the coating (105) has a contact resistance of between about $10^{-5}$ to about 100 m$\Omega$-cm$^2$.

19. The coated substrate of claim 1 wherein the coating (105) has an advancing contact angle between about 20° to about 45°.

20. The coated substrate of claim 1 wherein the coating (105) has a receding contact angle between about 0° to about 20°.

21. A coated substrate comprising a substrate (100) and a multi-layer nanoparticle coating (105) having a thickness of up to about 500 nm thereon, wherein the nanoparticle coating (105) comprises:
  a cationic polyelectrolyte layer (110) comprising polyacrylamide;
  an ionic mixed colloid layer disposed over the polyelectrolyte layer (110), wherein the mixed colloid layer comprises anionic hydrophilic colloid ions (130) comprising silica nanoparticles and anionic conductive colloid ions (120) comprising carbon based nanoparticles, wherein the silica nanoparticles and the carbon based nanoparticles are coupled through electrostatic and non-electrostatic forces, and the silica nanoparticles and the carbon based nanoparticles are both coupled to the polyacrylamide through electrostatic forces, wherein the coating has an elemental weight ratio of carbon to silicon of between about 1:1 and about 7:1 as measured by Energy Dispersive Spectroscopy (EDS).

22. The coated substrate according to claim 1, wherein the elemental weight ratio of hydrophilic colloid ion to conductive colloid ion in the coating is between about 2:1 and 7:1 as measured by EDS.

23. The coated substrate according to claim 21, wherein the elemental weight ratio of carbon to silicon in the coating is between about 2:1 and 7:1 as measured by EDS.

24. The coated substrate according to claim 23, wherein the elemental weight ratio of carbon to silicon in the coating is greater than 2.5.

* * * * *